United States Patent [19]

Brown

[11] 4,301,610
[45] Nov. 24, 1981

[54] FISHING LURE RETRIEVER

[76] Inventor: J. W. Brown, P.O. Box 61, Murfreesboro, Tenn. 37130

[21] Appl. No.: 80,764

[22] Filed: Oct. 1, 1979

[51] Int. Cl.³ .............................................. A01K 97/00
[52] U.S. Cl. ..................................... 43/17.2; 43/43.1; 43/44.97; D22/30
[58] Field of Search .................. 40/11 R, 11 A, 20 R, 40/24, 26, 316; 43/17.20, 43.1, 44.95, 44.97; 63/19, 21, 23; 70/456 R, 458; 24/3, 201 HH, 259 ES; D22/30, 31; D11/79, 80; D3/61, 65

[56] References Cited

U.S. PATENT DOCUMENTS

| | | |
|---|---|---|
| 50,896 | 11/1865 | Bowden . |
| D. 133,144 | 7/1942 | Struble .................................. D3/61 |
| 327,100 | 9/1885 | Palm . |
| 621,132 | 3/1899 | Phillips . |
| 717,237 | 12/1902 | Marsters . |
| 917,555 | 4/1909 | Davin . |
| 2,065,657 | 12/1936 | Coleman ................................ 63/21 |
| 2,109,693 | 3/1938 | Gaines et al. ...................... 43/44.97 |
| 2,385,415 | 9/1945 | Jack son . |
| 2,453,245 | 11/1948 | McDonald . |
| 2,514,760 | 7/1950 | Hanson et al. . |
| 2,562,413 | 7/1951 | Carr ..................................... 43/17.2 |
| 2,573,781 | 11/1951 | Wishart ........................ 70/456 R X |
| 2,593,716 | 4/1952 | Allen . |
| 2,627,691 | 2/1953 | Bress . |
| 2,714,777 | 8/1955 | Peak . |
| 2,779,120 | 1/1957 | Moore . |
| 2,800,738 | 7/1957 | Allman . |
| 2,908,991 | 10/1959 | Cummings et al. . |
| 2,915,845 | 12/1959 | Hughes . |
| 2,926,449 | 3/1960 | Rupert . |
| 2,979,847 | 4/1961 | McKinney . |
| 3,057,110 | 10/1962 | Michael ............................. 43/44.97 |
| 3,160,978 | 12/1964 | Corley . |
| 3,172,225 | 3/1965 | Zoss ..................................... 43/17.2 |
| 3,183,619 | 5/1965 | Walden . |
| 3,191,335 | 6/1965 | Sobetzer . |
| 3,375,602 | 4/1968 | Clark et al. . |
| 3,382,599 | 5/1968 | Beverley . |
| 3,735,520 | 5/1973 | Jarrett . |
| 3,754,345 | 8/1973 | Whitehead . |
| 4,041,634 | 8/1977 | Martinez . |
| 4,043,072 | 8/1977 | Condurso . |
| 4,057,925 | 11/1977 | Wong . |

Primary Examiner—Stephen G. Kunin
Assistant Examiner—Robert P. Olszewski
Attorney, Agent, or Firm—John B. Hardaway, III; Wellington M. Manning, Jr.; Luke J. Wilburn, Jr.

[57] ABSTRACT

A fishing lure retriever for quickly and reliably releasing and retrieving lures, plugs or other fishing tackle which have become entangled on obstructions, vegetation or timber during the fishing process. The device comprising a disk-shaped, weighted body having a frontal opening located therein and a suspension closure rotatably joined together by connecting apparatus which are spatially disposed within the aforementioned frontal opening and which securely engage the suspension closure holding it in place for being disposed about a snagged fishing line so that it can slidably travel along said line from a point spatially disposed between the tip of a fishing rod and the snagged lure, thereby freeing the ensnared lure and allowing both to be retrieved by the angler for inspection, repair, and subsequent reuse.

8 Claims, 3 Drawing Figures

FISHING LURE RETRIEVER

BACKGROUND OF THE INVENTION

1. Field of Invention

The present device relates to sporting goods and more particularly to a lure retrieving device for releasing snagged fishing tackle.

2. Prior Art Description

As a general proposition, it is well recognized in the art of sport fishing that most bodies of fishable waters are infested with ensnarling vegetation, debris, timber and other obstructions upon which hooks, lures, plugs and other tackle may, from time to time, become embedded or snagged during the fishing process.

Traditionally accepted procedures for releasing snagged fishing tackle include: cutting bait and taking one's losses; or the expenditure of time, patience and effort in an attempt to free the snagged lure and associated tackle. While this latter course of action is somewhat frustrating, it is the alternate which nearly all sport fishermen elect to take although it bears certain risks of loss of the snagged tackle. Quite frequently, this latter process involves relocation of the boat or fisherman to a location behind the point of ensnarement. Once so positioned, the angler places or disposes a lure retrieving device about the fishing line and allows it to slide by gravity down to the front of the caught tackle. Most of these devices are dependent upon the weight of the lure retriever and its impact in the vicinity of the snagged lure to force it backward and free from the object upon which it is caught. The additional weight and impact of the lure retriever makes the area of the line most nearly adjacent to the caught hook much more responsive to up-down or left-right jerking movements by the angler. Such movements are often necessary to free the ensnarled tackle.

Various forms of lure retrievers and other tackle accessories have been proposed in the prior art to avoid the loss of time, money and patience so often experienced by the angler when his fishing line has become so entangled. As previously explained, most sport fishermen feel that they must make a good-faith effort to release their caught fishing tackle since such rigs are expensive and time consuming to prepare. Additionally, fishing is a pleasure sport and a favorite lure to most anglers has an intrensic value far in excess of its original purchase price or replacement cost. Further, the angler must, if he elects to cut his line and take his losses, expend additional time and money to install and rig a new fishing line which diverts time away from the fishing process itself.

To solve this perplexing problem of the great sport of fishing, numerous devices have been proposed by the prior art. These devices have been of various geometric configurations, sizes and clamping means to fasten to the fishing line. Many, if not all, of these devices have been met with only limited degrees of success. By and large, they have been impractical or unsatisfactory because of their weight, size or complexity made them too cumbersome to store and handle in an ordinary tackle box. Additionally, they were difficult and time consuming to apply and release as well as generally inefficient or unreliable for their intended purpose. Further, the angler not only experienced the unnecessary loss of valuable fishing tackle, but incurred loss of the expensive lure retriever as well. On some occasions the cost of the lure retrieving device was far in excess of the lost lure and associated tackle. Experience has taught that the majority of these devices were often incapable of rendering the desired performance because of inadequate design, complexity of component parts, operator error or simple ineffectiveness. Often times, these devices were not free to travel in tight spaces, lacked mobility, and became entangled upon themselves or their control lines, or required a multiplicity of hands to be applied, operated and released. Wong, U.S. Pat. No. 4,057,925 dated Nov. 15, 1977, gives a detailed explanation, history and summary of the prior art devices, which for purposes of brevity, will not be herein repeated. However, it is firmly believed that none of the prior art devices have satisfactorily performed as a commercial success and economic reality because they were too expensive, cumbersome or ineffective to achieve widespread acceptance and utilization by sport fishermen. This is especially true when the prior art device is more expensive than the snagged lure and is just as susceptible to loss on its first use by the angler. Further, the complexities of design of the prior art devices made them so time consuming to install that they could not be reliable.

SUMMARY OF INVENTION

Therefore, it is an object of the present invention to provide a device simple in construction and operation which is efficient, lightweight and durable for the purposes of removing and retrieving snagged fishing lures, plugs and related tackle in a quick, easy and reliable manner. Said device would fulfill a definite longfelt need in this field and eliminate the formerly experienced problems of lost fishing equipment and lure retrievers. Because of its unique and novel design, it would achieve widespread consumer acceptance and could easily be massed produced in sufficient quantities to make it an economic, commercial success.

It is a further object of the present invention to provide a reliable device for detaching a lure from a snag or obstacle to which it has become ensnared and freeing said lure so that it can be returned to the angler, along with the retrieving device itself, for inspection, repair and subsequent reuse.

It is another object of the present invention to provide a device having a dependable service life which can be utilized in frequent applications of the same device without necessitating the purchase of new devices except in cases of extended use, abuse or unavoidable accident. Also, it is intended to provide a device for the expected purposes which does not require special tools, procedures or mechanical skills, abilities or aptitudes to apply, practice and remove.

Additionally, it is an intended object of the present invention to provide a device which has no objectionable characteristics, but which has the essential features of compactness, inexpensiveness and portability so that it will easily fit into the ordinary tackle box of a sport fisherman.

These and other objects of the invention are satisfied by the present device which obviates the problems or deficiencies of the prior art mentioned above and which accomplishes the objectives and purposes herein specified. These surprising and unexpected results are achieved by the present device which is basically a weighted body fastened to a snap hook. In use, the angler disposes the present invention about the fishing line by depressing the hook with his thumb and passing the fishing line into the big end of the hook. No special tools or skills are necessary to perform this task. Once positioned, the present invention slidably travels the length of fishing line from the pole end to the lure end. As the lure retriever approaches the vicinity of the snagged lure, the additional weight in this vicinity makes it more responsive to the angler's manipulations to free the hook by direct impact or by jerking.

BRIEF DESCRIPTION OF THE DRAWINGS

These and other aspects of the invention will be more fully understood and appreciated from the following detailed description and explanation of the accompanying drawings in which.

DETAILED DESCRIPTION

Throughout the description that follows, like numerals refer to the similar parts or features of the lure retriever in the various drawings.

Figure 1:
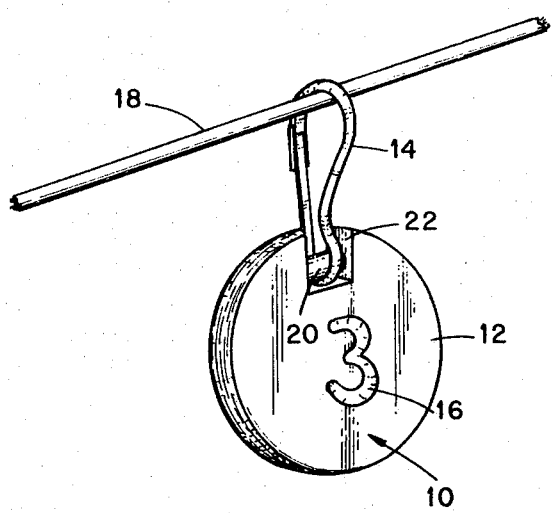
FIG. 1 is a perspective view of the lure retriever slidably mounted on a segment of fishing line.

Referring to the drawings, and particularly to FIG. 1, the reference numeral 10 designates the lure retriever of the invention generally. In its preferred form it consists of two principal elements: a suspension closure and a disk-shaped, weighted body. These principal elements are joined together by connecting means. Said means may be formed as an integral part of the weighted body through a monolithic casting process, or it may be a pin which has been inserted or cast into the frontal opening of the weighted body. These elements, their functions and interactions, will be described more clearly in the following specification.

FIG. 1 is a perspective view which depicts the elements of the present invention in detail. The lure retriever 10 is manufactured from readily available materials of construction and can be produced by current methods of fishing tackle manufacture. Once produced, the present invention could also be distributed along currently available channels of fishing tackle distribution. Thus, no problems are anticipated in gaining access to the marketplace for the current invention. Experience has shown that lure retrievers should be made of non-corrosive materials such as bronze, lead, plastic or other heavy material. These materials should also exhibit sufficient durability and reliability to withstand the abuse and neglect of fishing accessories common to the sport. However, the material of construction must allow the lure retriever to be mobile and portable within the scope of its anticipated use. Preliminary prototypes of this invention have been fabricated from lead and and spring steel which have proven to be extremely reliable, durable and conservative. In this form, the present invention has been met with a substantial degree of acceptance by anglers in preliminary testing. Said properties mean that the present invention can be easily fabricated, inexpensively manufactured and readily mass produced in sufficient quantities to make it an economic success within the fishing tackle industry. Further, the utilization of special manufacturing processes and highly skilled labor is unnecessary to make such a device, assuring a low retail price for sport fishermen.

Figure 2:
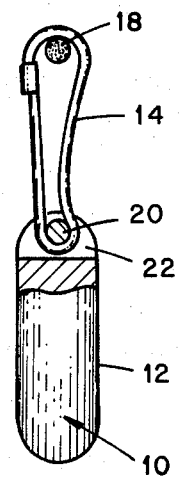
FIG. 2 is a side view of the device shown in FIG. 1.

As shown in FIG. 1, the lure retriever 10 is constructed by current methods of fishing tackle manufacture. The disk-shaped, weighted body 12 can be cast, molded or stamped by conventional methods so that a frontal opening 22 is therein formed. The weight numeral 16 imprinted on the disk 12 can be formed at this stage or stamped thereon at a later stage of production. The purpose of the imprinted numeral is to indicate the weight in ounces, or similar units of measure, of that particular lure retriever model. This is because experience with the present device has indicated that various sizes and weights are necessary to free snagged lures because of the joint interaction of their complexity and the particular obstacle or mode of their entanglement. Therefore, it is anticipated that the angler should be provided with a wide selection of units from which he can best choose the one necessary to free his lure based upon his own experience. In order to assure portability and compactness, it is currently anticipated that the present invention will be made available in one ounce increments, or similar units of measure, from one to sixteen ounces. In those cases where additional weight is needed, or situations where only one or more units have been purchased by the angler, he may use a combination of the devices to accomplish the desired result. Also, to assist the angler in quick installation of the present device, it is anticipated that one side of the disk-shaped body 12 will be coated or painted with an illuminous paint such as international orange. This may, or may not, be the same side as the one having the reference numeral 16 imprinted on it. In FIGS. 1 and 2, it is opposite sides that are so identified. The purpose of the painted surface is to assist the angler in proper alignment of the snap hook 14 which will always be assembled in the same manner. Preferably with the snap hook 14 having its open side to the painted surface. By the mere sense of feel, the angler will then know which side is painted, and hence, how to place the present invention on his line without further attention. This feature will make the installation of the present invention almost second nature! If the painted side and the reference numeral are located on the same side, the depression caused by the stamping of the numeral would also aide the sense of feel although painting is sufficient to practice the invention. Further, the painted side could assist the angler in observing the complexity of his entanglement below the surface of the water.

The suspension closure or snap hook 14 of the prototype was manufactured by traditional processes of spring steel manufacture. While this material of construction is adequate, it is anticipated that the preferred embodiment of the instant invention 10 will be mass produced with a plastic suspension closure 14 to accomplish substantial cost savings assuring a low consumer purchase price. Alternatively, the weighted body 12 could also be produced of another material of construction should the price of lead unreasonably escalate.

During the casting process of the disk 12, the connecting means 20 is also formed or installed. For purposes of economics, it is anticipated that the connecting means 20 will nearly always be formed at the same time as the weighted body 12 by traditional monolithic casting techniques. However, the connecting means 20 may also be a pin of slightly longer length than the width of the frontal opening 22 in the disk 12. The pin could be made of carbon steel, aluminum, or similar rigid properties. Assembly of all the elements of the present invention 10 can be carried out simultaneously in the casting process, or by subsequently inserting the suspension closure 14 in the frontal opening 22 of the disk 12 and disposing the closure about the connecting means 20.

Referring to FIG. 2, the novel design of the present invention 10 is clearly shown in this side view. Many of the prior art devices were unsatisfactory or impractical because they could not be used in tight spaces. Their geometric shapes were generally the biggest problem in this area. They were of a circular, parabolic or trapezoidal cross-section. As applied, these antecedent devices presented their broadest surface area to the normal path of travel along the fishing line. This created undue resistance and unnecessary loss of momentum in the air and water due to greater drag forces. The possibility of entanglement or ensnarement of the lure retriever itself on obstacles or other debris was also unduly enhanced by this design flaw. These and other deficiencies of the prior art are obviated by the instant device 10 which presents its minimal cross-sectional area to the normal path of travel along the fishing line 18 as shown in FIG. 2. Since the present invention does not utilize a second line or control line as many prior art devices did, it does not have the risk or entangling or fouling said line with the fishing line or other obstacles. Also, the rounded surfaces of the disk shaped, weighted body 12 virtually eliminate any possibility of the present invention 10 not free-falling along the path of the fishing line 18 from the pole to the snagged lure. Thus, the present lure retriever will have a long, dependable service life allowing frequent reapplications of the device without purchasing a new device except in extreme instances of abuse, neglect or unavoidable accident.

Figure 3:
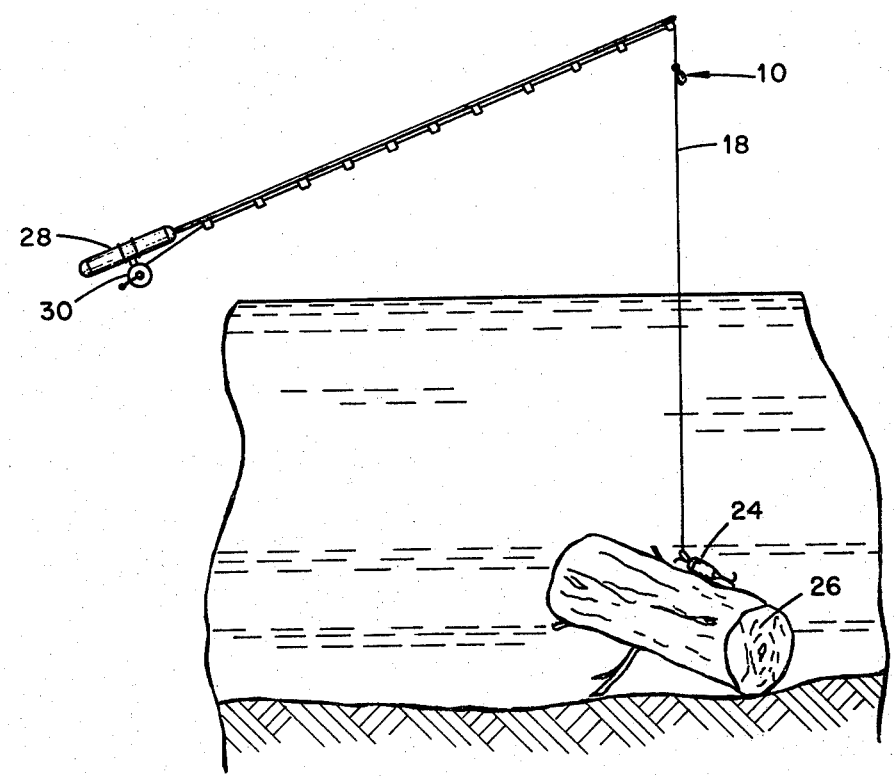
FIG. 3 is a schematic depiction of the lure retriever in action.

FIG. 3 is a perspective view showing the utilization of the present device. A fishing rod 28 is depicted with a reel 30 and a fishing line 18. The lure 24 has become ensnared upon an underwater obstacle 26. To apply the present invention 10, the angler simply places the lure retriever in one hand, brings said hand to close proximity with the fishing line 18, depresses the suspension closure 14 with his thumb, and simultaneously disposes said device about the line. To release the present invention, the steps given above are performed in reverse order. The positive locking action of the suspension closure 14 insures against accidental or inadvertent loss while the lure retriever 10 is traversing along the line 18 from pole 28 to snagged lure 24. It is a very important feature of the present invention that this application process can be accomplished with just one hand. When a fishing line becomes snagged upon an obstacle, the angler must back the boat up, or position himself in a manner directly above the point of entanglement. This involves the use of a sculling paddle or other means of propulsion in one hand. As any experienced fisherman knows, the positioning of a boat is only a temporal thing. Time is of the essence in disengaging the snagged hook because the boat will naturally drift with the current, wind, or wake from other boats until it is out of position. Further, the chances of freeing a snagged lure, plug or other item of fishing tackle are greater if the line 18 is nearly vertical with the surface of the water to give the lure retrieving device practically a straight shot at the lure. At this point, the prior art devices become totally impractical. Most require the hands and arms of an octopus to install and an eight hour shift to get onto the line and into position to use. Further, many of these devices require the use of two or more hands to operate since they utilize a second line to lower the device. These unacceptable deficiencies are obviated by the present invention 10 which quickly and reliably fastens to the fishing line 18 in a matter of seconds with only one hand being necessary to accomplish the task. Thus, the remaining hand is free to hold the rod 28, the boat or sculling paddle as necessary to accomplish the goal of lure freeing and retrieval.

To use the present invention 10, the angler then places tension in the fishing line 18 by positioning his pole 28 for this purpose so that said line is practically vertical with the surface of the water. The lure retriever 10, which is spatially disposed at a point between the rod 28 and the lure 24, then begins its maximum free falling acceleration down the fishing line 18 by the interaction of gravity and any momentum which may have been imparted by the angler. The combination of impact created by the slidably engaged lure retriever 10 on the line 18 and of the manipulations imparted by the angler frees the lure 24 that has become snagged. While experience has indicated that the first impact is usually sufficient to free the lure, additional impacts may be created by the angler by giving the pole 28 up and down or left and right jerks or manipulations. The hammering action thus imparted to the lure 24 by the present device 10 is sufficient to release the ensnared tackle. Once the line 18 has been freed, the lure retriever 10 is removed by depressing the suspension closure with the thumb of one hand and disengaging the present invention from the line. The lure retriever of the present invention is then returned to the tackle box for subsequent use by the angler.

The disclosed apparatus has proven to be extremely versatile, reliable and efficient in practice. It can quickly and effectively be applied to the intended task of lure releasing and retrieval. It may be mass produced in sufficient quantities to assure low and reasonable production costs for the manufacturer which can be passed along to the retail outlet because of simple design, inexpensive materials of construction and minimal labor costs for production and assembly. Further, the present device can be distributed and marketed along traditional channels of commerce for the fishing tackle industry. Its novelty, uncomplicated structure and practicality assure widespread use and acceptance by the sports fisherman justifying the purchase and inventorying of the present device by sporting goods retailers.

From the foregoing description and reference to the accompanying drawings, it is believed that a clear, precise and comprehensive understanding of the construction, operation, utilization and the advantages of the present invention may be had by one normally skilled in the pertinent art.

While the present invention has been illustrated and described with respect to a certain specific embodiment, it will be appreciated by those skilled in the art that many adaptations, modifications or departures can be made within the spirit and scope of the present invention. Accordingly, it is intended by the appended claims to cover all such adaptations, modification departures as are the equivalents of the herein described and illustrated lure retrieving device.

What is claimed and desired to be secured by Letters Patent from the United States of America is:

1. An apparatus for releasing an entangled fishing lure comprising:
 a disc shaped body having a generally planar circular frontal portion and a generally planar circular rear portion connected by a generally annular side wall, said disc shaped body defining an opening therethrough between said frontal wall and said rear wall;

a pin disposed within and transversing said opening; and connecting means rotatably disposed on said pin for quickly joining said disc shaped body to a fishing line.

2. The apparatus according to claim 1 wherein the cross sectional area of said body portion as defined by a plane perpendicular to said frontal portion and said rear portion is small in comparison to the area of either said frontal portion or said rear portion and wherein said connecting means is effective to connect said body portion to said fishing line for movement of said body portion along a line transverse to said cross sectional area defined by said side.

3. The apparatus according to claim 1 wherein said connecting means is a snap hook for connecting said body portion to a fishing line and maintaining said pin in generally parallel relationship to said fishing rod.

4. The apparatus according to claim 1 further comprising a fishing line attached to said body portion with said connecting means and having no other lines attached to said apparatus.

5. The apparatus according to claim 1 wherein said body portion comprises a material selected from the group consisting of lead and bronze.

6. The apparatus according to claim 1 wherein said connecting means comprises a material selected from the group consisting of spring steel and plastic.

7. The apparatus according to claim 1 further comprising an illuminous paint on said body portion.

8. The apparatus according to claim 1 further comprising indicia on said body portion to indicate the weight thereof.

* * * * *